US009489707B2

(12) United States Patent
Nalluri et al.

(10) Patent No.: US 9,489,707 B2
(45) Date of Patent: Nov. 8, 2016

(54) SAMPLER LOAD BALANCING

(71) Applicant: INTEL CORPORATION, Santa Clara, CA (US)

(72) Inventors: Hema Chand Nalluri, Hyderabad (IN); Joy Chandra, Bangalore (IN); Prosun Chatterjee, Bangalore (IN); Benjamin Pletcher, Mather, CA (US); Yoav Harel, Folsom, CA (US); Steven Spangler, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 14/039,135

(22) Filed: Sep. 27, 2013

(65) Prior Publication Data

US 2015/0091919 A1    Apr. 2, 2015

(51) Int. Cl.

| G06F 13/14 | (2006.01) |
| G06F 15/00 | (2006.01) |
| G06T 1/00 | (2006.01) |
| G06T 1/20 | (2006.01) |
| G06F 3/00 | (2006.01) |
| G06F 9/50 | (2006.01) |

(52) U.S. Cl.
CPC . *G06T 1/20* (2013.01); *G06F 3/00* (2013.01); *G06F 9/5083* (2013.01); *G06T 2200/28* (2013.01)

(58) Field of Classification Search
None
See application file for complete search history.

(56) References Cited

U.S. PATENT DOCUMENTS

| 6,195,687 | B1* | 2/2001 | Greaves et al. | 709/208 |
| 7,804,504 | B1* | 9/2010 | Agarwal | 345/505 |
| 2012/0019542 | A1* | 1/2012 | Shah et al. | 345/522 |
| 2013/0038620 | A1* | 2/2013 | Hakura et al. | 345/582 |

OTHER PUBLICATIONS

Extended European Search Report received for EP Patent Application No. 14186299.5, Mailed on Feb. 3, 2015, (7 pages).
Tzeng, Stanley et al., "Task Management for Irregular-Parallel Workloads on the GPU", Eurographics Associate, Jun. 27, 2010, Retrieved from the Internet: //www.idav.ucdavis.edu/publications/printy_pub?pub_id=1036. Retrieved Feb. 3, 2015, (9 pages).

* cited by examiner

*Primary Examiner* — Jacinta M Crawford
(74) *Attorney, Agent, or Firm* — International IP Law Group, P.L.L.C.

(57) ABSTRACT

Embodiments described herein include a graphics processing unit. The graphics processing unit includes a plurality of execution units. The graphics processing unit also includes a plurality of sampler units. Each sampler unit corresponds to a sampler dispatch logic unit and at least one execution unit, and the sampler dispatch logic units are used to network the plurality of sampler units.

24 Claims, 10 Drawing Sheets

800

SAMPLER LOAD BALANCING

BACKGROUND

In a typical graphics subsystem, a graphics processing unit (GPU) used to process three dimensional (3D) graphics includes a plurality of execution units that executes shaders. In some cases, a shader is code that performs a graphics function. A shader may include a sample instruction within the shader code. The sample instruction may sample texture information that is used to render computer graphics. The sample instruction can be executed in a number of ways, such as using a dedicated GPU hardware component that takes as input the sample instruction and a GPU state from the execution unit, and outputs a texel value. In some cases, the dedicated hardware component is a sampler unit. A programmable engine may also be used to determine texel values from a sample instruction. Texture coordinates computed by sampler unit may be used to derive texel values from the texture map, which are returned to execution units in response to sample instruction.

In some cases, there are multiple execution units on which multiple shaders are running concurrently, each shader exercising multiple sample instructions. A group of execution units and associated sampler units may be referred to as a sub-slice. In some cases, a slice is a group of more than one sub-slices. Each sampler unit is designed to execute the sample instructions in an efficient manner. However, the gate count attributed to the sampler unit may be relatively high and can contribute substantially to the power consumed by the GPU. Additionally, depending on the type of shader dispatched to a sub-slice, the sampler unit access generated by each sub-slice varies. As a result, sampler units across sub-slices and slices are not uniformly loaded with sample instructions.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
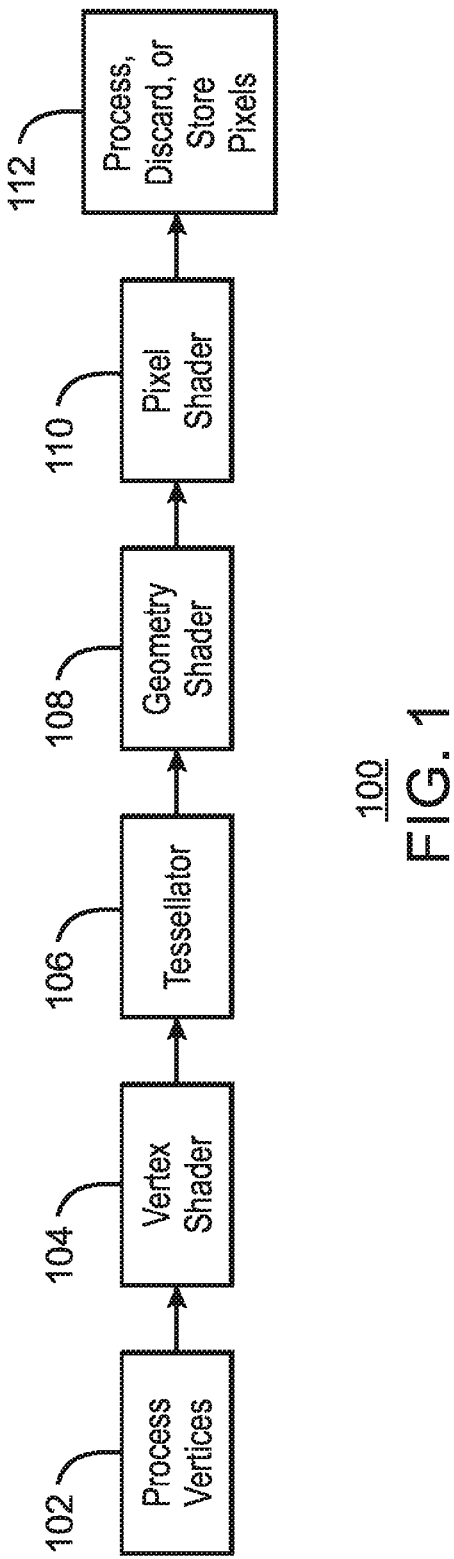
FIG. 1 illustrates a graphics rendering pipeline, in accordance with an embodiment.

The rate at which each execution unit accesses a sampler unit may vary based on the sample instruction density within the shader being executed. Further, sampler instruction density itself varies within a frame, across multiple frames, across 3D workloads, across general purpose graphics processing unit (GPGPU), and across media workloads. Typically, GPUs are wired for worst case scenario. Accordingly, GPUs include a high number of sampler units so that sampler dense workloads can be supported. Each sampler unit remains powered on, regardless of the workload sent to it by the corresponding execution units. Furthermore, execution units typically send instructions to an assigned sampler unit, regardless of the workload across the sampler units of the GPU.

Embodiments described herein provide sampler workload balancing. Based on the hardware configuration, multiple execution units may share one sampler unit or multiple sampler units for their sample instructions. The assignment of execution units to sampler units may be dynamically configured as the GPU workload changes. In embodiments, a GPU includes a plurality of execution units and a plurality of sampler units. Additionally, each sampler unit corresponds to a sampler dispatch logic unit and at least one execution unit, and the sampler dispatch logic units interconnect the plurality of sampler units. The interconnection between the sampler units enables a network of samplers that can be powered on and power off based on the workload.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 illustrates a graphics rendering pipeline 100, in accordance with an embodiment. Although the pipeline described herein contains certain elements, a graphics pipeline may contain more or less elements than those described herein. The graphics rendering pipeline 100 is used for exemplary purposes. As used herein, a pipeline refers to a set of linked computing processes. Data is sent as input to the first process in the pipeline, the output of each process is sent to the next process as input until data has exited the linked set of processes.

When three dimensional (3D) computer graphics are rendered, the graphics data is typically sent to a GPU as a set of vertices that forms the geometry of a 3D image. The vertices may be used to form a primitive representation of objects within the 3D image. The primitives include points, triangles, and lines. At block 102, vertices are processed. The initial processing of vertices includes, but is not limited to, determining the lighting for each vertex as well as determining the types of transformations to be applied to each vertex. Light sources may be defined by their location in the image. Other properties, such as chrominance, reflectance, and luminance may also be determined.

At block 104, a vertex shader may be used to transform the position of each 3D vertex from to a 3D coordinate space to a 2D coordinate space. At block 106, a tessellator may be included. The tessellator may tilt or tessellate the primitives according to the movement of the graphics. In examples, the tessellator may include a hull shader and a domain shader. At block 108, a geometry shader may be used to generate new primitives from the primitives originally sent to the graphics rendering pipeline. At block 110, a pixel shader may be used to compute colors and other attributes of the pixels to be rendered. In examples, the color of each pixel is determined by sampling a number of texels from the underlying texture map. The number of texels sampled may vary depending on the particular algorithm used determine the pixel color. At block 112, the pixels may be processed, discarded, or stored in an output buffer.

A processor, such as a central processing unit (CPU) or a graphics processing unit (GPU), may used to execute the graphics rendering pipeline 100 within a system. Although embodiments described herein execute the graphics rendering pipeline using a GPU, any processing unit may be used. In embodiments, the GPU may be a single instruction, multiple data (SIMD) processor. Accordingly, the GPU includes a plurality of execution units that can operate on several threads in parallel. Computing systems may have different instruction widths for SIMD processing. For example, the instruction widths may accommodate processing n pixels within a thread in parallel. The value of n is typically, eight, sixteen, thirty-two, or sixty-four. By processing multiple pixels in parallel, an SIMD-based GPU can use the parallelism of the graphics data to efficiently process the data. In embodiments, workloads, such as camera input, print, and display imaging workloads, are processed using an SIMD-based GPU. Alternatively, a system on a chip (SOC) may implement SIMD using single instruction multiple thread (SIMT) processors. An SIMT processor includes SIMDs units running in parallel.

In examples, an API may be used to render 3D graphics on the GPU. The APIs include, but are not limited to DirectX and OpenGL. During the execution of the thread, the images may be modified, transformed, or otherwise changed by the shaders being executed. The shaders may include instructions that cause each thread to sample one or more texels from the texture map. For example, when computing a pixel color, the pixel shader may include instructions that cause the thread to sample texels from the texture map. Typically, sampling logic is used to sample texels from the texture map. For descriptive purposes, a sampler unit is used to describe the sampling logic used in the present techniques. However, any sort of sampling logic could be used, and the present techniques should not be limited to a sampler unit. In some cases, the sampler unit is a hardware component of the GPU.

Figure 2:
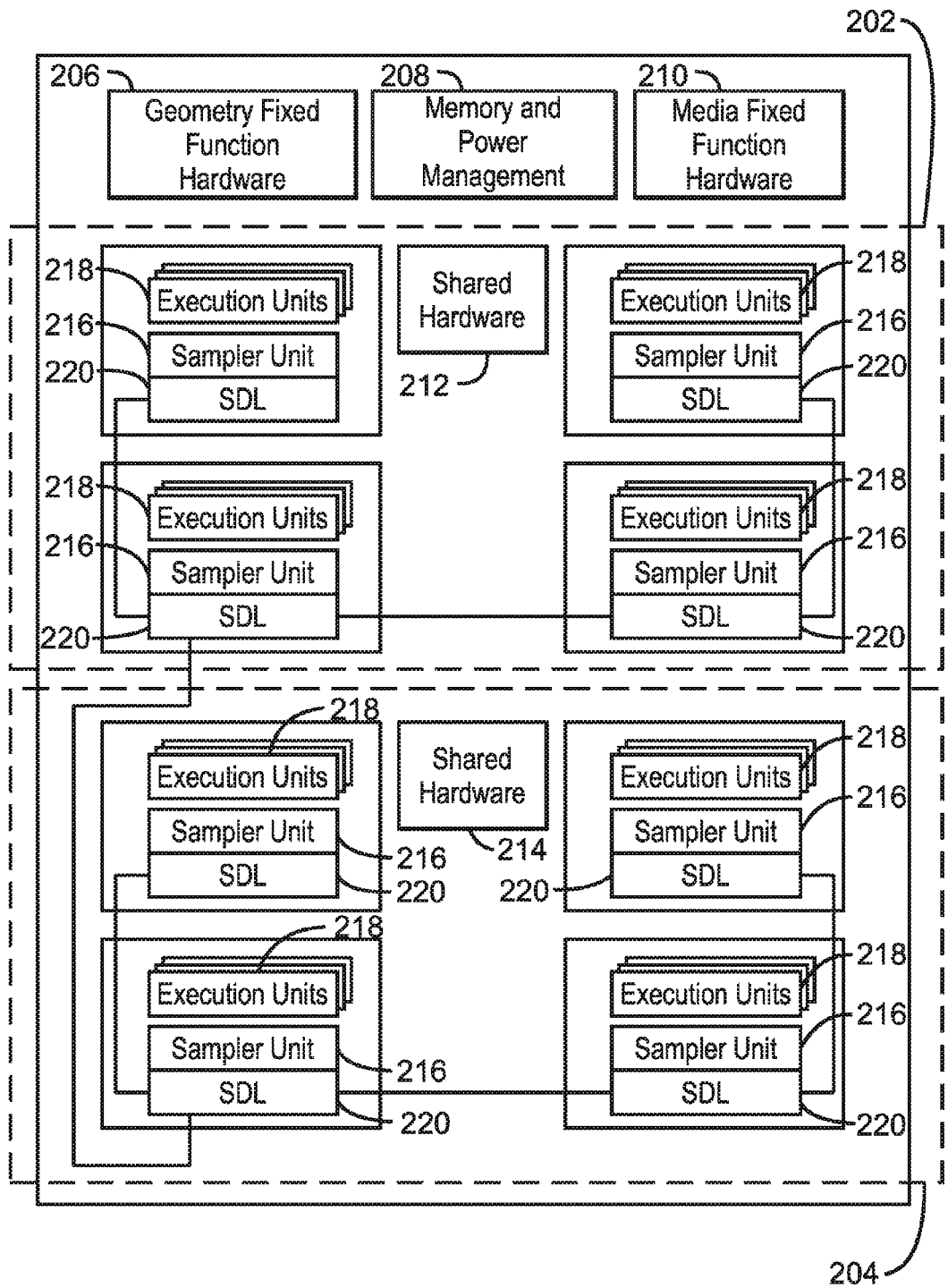
FIG. 2 is an illustration of exemplary GPU hardware.

FIG. 2 is an illustration of exemplary GPU hardware. The GPU 200 includes a slice 202 and a slice 204. Other GPU hardware not included in the GPU slices are a geometry fixed function hardware unit, a memory and power management unit 208, and a media fixed function hardware unit 210. Each of the slice 202 and the slice 204 include additional hardware units that may be shared within each slice 202 and 204. As a result, the slice 202 includes shared hardware 212 and the slice 204 includes shared hardware 214. Shared hardware may include hardware that is shared by the graphics pipeline, such as a memory, a rasterizer, pixel operations, and output pipelines.

Each slice includes a number of sampler units 216 and associated execution units 218. Each execution unit 218 receives commands from a shader, such as the pixel shader of the graphics rendering pipeline. When an instruction received by an execution unit 218 is a sample request, the request is sent to the sampler unit 216 for execution. In examples, the sample request may include texture coordinates, and the corresponding sampler unit 216 may sample the values at the particular coordinates, and then return those values to the requesting execution unit so that the pixel color may be computed.

Depending on the nature of the workload particular context being executed, the sampler unit may not be used efficiently. For example, while the slice 202 includes four sampler units 216, only varying numbers of execution units may be executing for each sampler unit 216. In embodiments, the sampler units 216 may be allocated statically, dynamically, or in a hybrid fashion using sampler dispatch logic (SDL) 220. In examples, the SDL 220 is used to create an infrastructure so that the sampler units may be allocated according to the workload. The SDLs 220 may be connected by a routing friendly interconnect or data bus 222 that connects each sampler in a slice. The interconnect or data bus 222 may also be used to connect SDLs 220 across slices. The topology of connecting the SDLs in a slice may be based on the SDLs physical placement with in a sub-slice or slice. The SDLs physical placement within the sub-slice or slice may be referred to as an SDL floor plan. The In embodiments, the physical placement of SDLs may be used to group samplers in adjacent sub-slices, which may be physically placed on one side of the shared hardware, rather than connecting all the samplers. Additionally, the various allocation modes, such as static, dynamic, or hybrid, can be achieved by enabling network support between the sampler units. A software interface may be provided to the hardware through memory mapped input/output (MMIO) or a state command to control the number of samplers to be enabled or disabled. In examples, MMIO is addressable registers implemented in hardware which can be written or read by the software running on the host processor. The software may dispatch a workload to the hardware by programming commands in memory, and then asking the hardware to execute. Additionally, in examples, a state command is a command included in the workload that sets the state of the hardware. The software can program a state command to set the number of samplers to be enabled for a given workload. The MMIO or state command can support both dynamic and static control of sampler units.

Figure 3A:
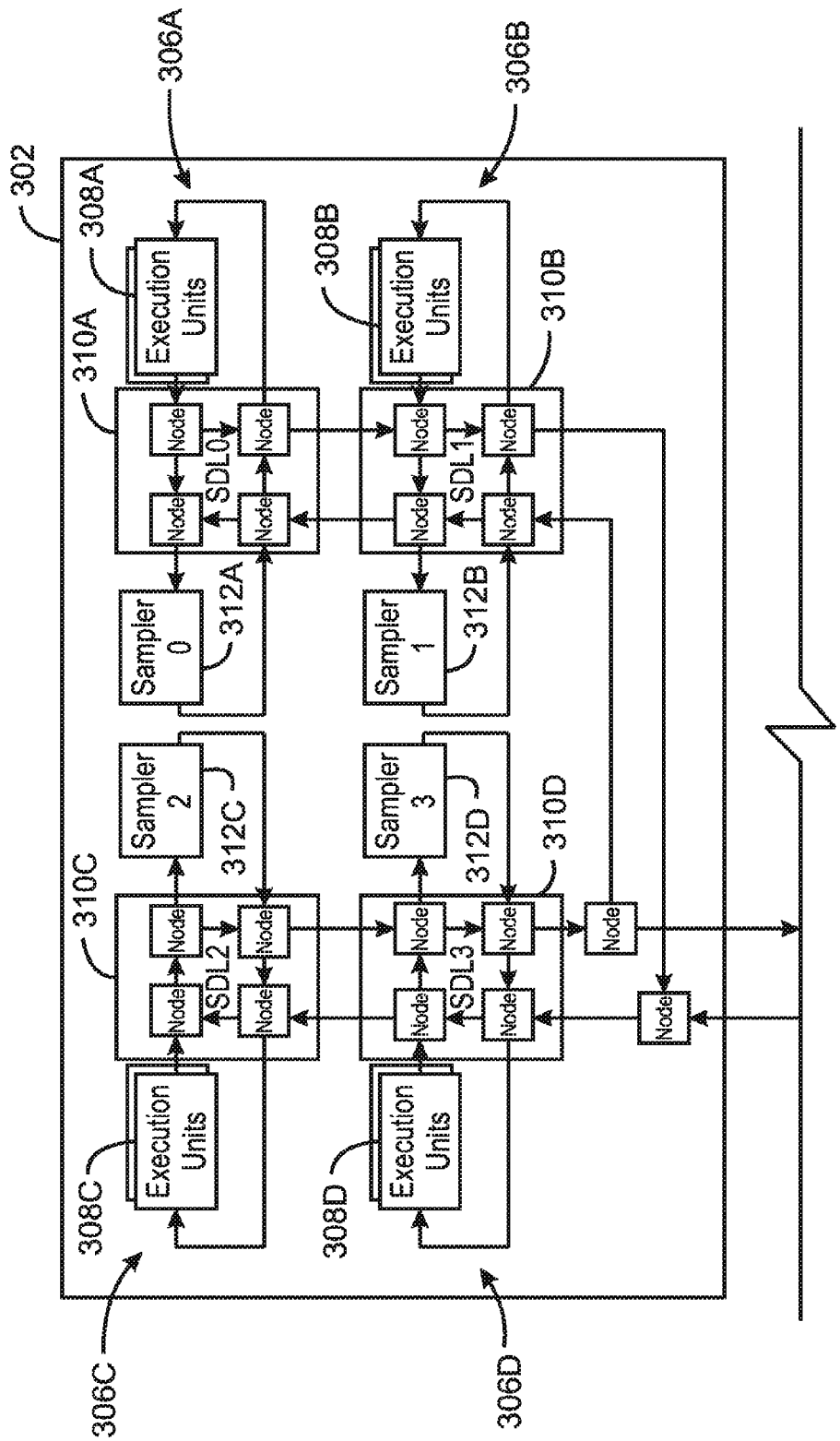
FIGS. 3A and 3B are an illustration of a sampler dispatch infrastructure.
Figure 3B:
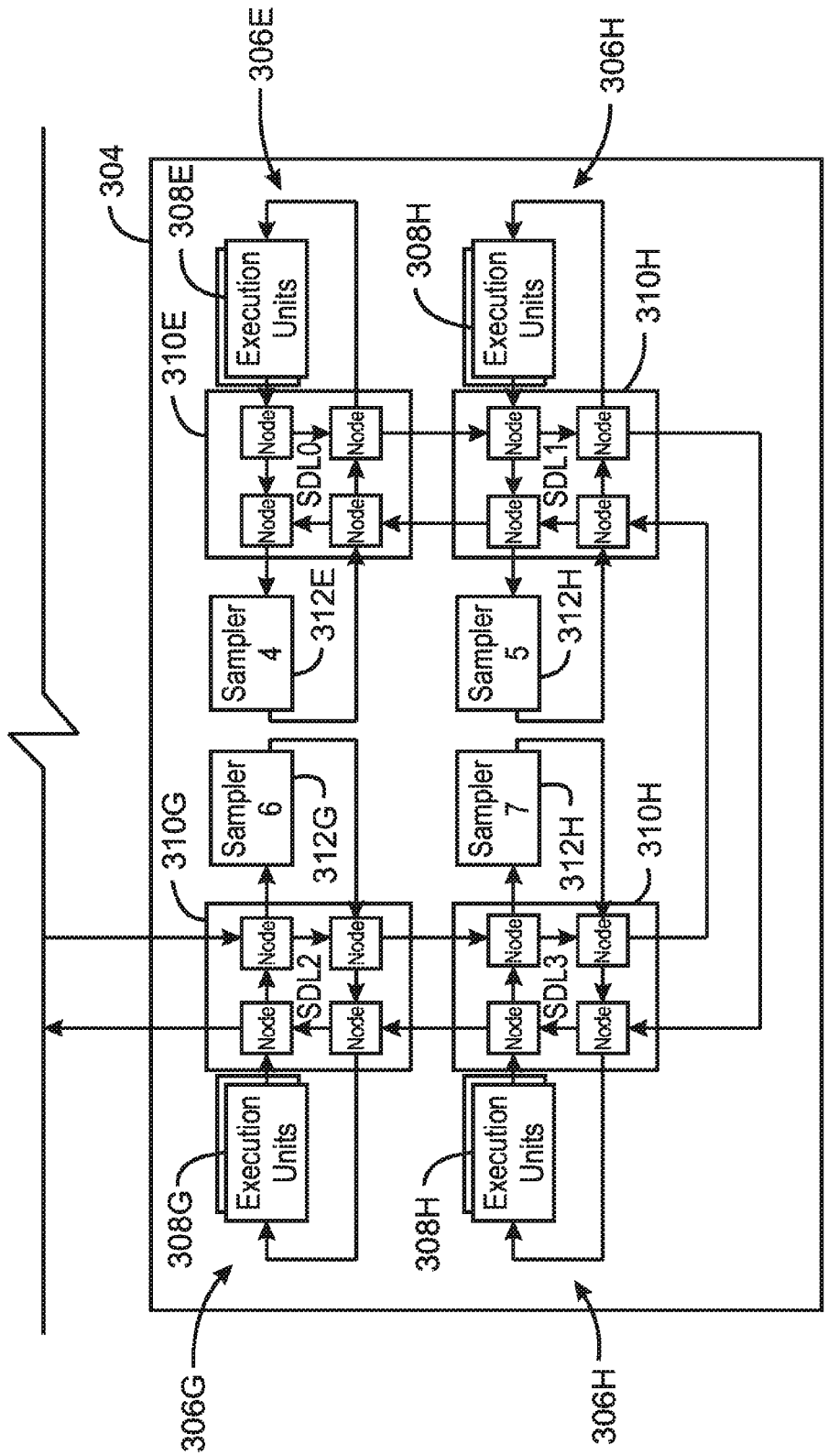

FIGS. 3A and 3B are an illustration 300 of the sampler dispatch infrastructure. The infrastructure includes a slice 302 and a slice 304. Each of the slice 302 and the slice 304 contains four sub-slices. Accordingly, slice 302 includes a sub-slice 306A, a sub-slice 306B, a sub-slice 306C, and a sub-slice 306D. Similarly, slice 304 includes a sub-slice 306E, a sub-slice 306F, a sub-slice 306G, and a sub-slice 306H. Each sub-slice 306A-306H includes a number of execution units. Particularly, FIGS. 3A and 3B include execution units 308A-308H, a sampler dispatch logic (SDL) units 310A-310H, and a sampler unit 312A-312H, respectively. The SDL units 310A-310H enable the sampler units 312A-312H to be networked together such that the sampler units may be considered a pool of sampler units. For descriptive purposes, four sub-slices and two slices are shown, however any number of slices and sub-slices may be used.

In some cases, each of the SDL units 310A-310H are a smart dynamic load balancer unit that is located at the input of every sampler unit. Each sampler unit 312A-312H has a corresponding SDL unit 310A-310H. The sampler unit 312A-312H and its corresponding SDL unit 310A-310H are assigned a unique identification. In examples, the unique identification is based on the location of the sampler unit or SDL unit within each slice and sub-slice. Each SDL unit 310A-310H may connect to the other SDL units 310A-310H based on the topology decided for a given project. The physical topology of the network of SDL units may be any physical topology now known or developed in the future. Examples of such physical topologies include to fully connected, bus, star, ring, double ring, tree, mesh topologies, point to point, tree, hybrid, and daisy chain. The logical topology of the network of SDL units may be any topology now known or developed in the future. In some examples, nodes may be used to route the data through the network of SDL units. Additionally, the SDL units 310A-310H may also implement statistic counters to account for the corresponding sampler unit accesses. These statistics can be read by software and used to balance with workload allocated to each sample.

The SDL units can operate in various allocation modes in order to route sample instructions to a particular sampler for processing. For example, in a dynamic mode, the samplers may be powered on and powered off on the fly. In a slice with four samplers, the corresponding SDL units may determine that a particular workload uses two of the four samplers. The SDL units may then power down two of the four samplers, and re-route the sample instructions assigned to the powered down samplers to samplers that are powered on.

In some cases, the dynamic mode may be hardware or software based. When the dynamic mode is software based, the software may dynamically read the sampler access statistics from the sub-slices, and then evaluate the number of samplers required at a periodic interval. The software can dynamically configure the hardware with the required samplers for a workload. The hardware will activate and deactivate the samplers as per the software request. In a hardware based dynamic mode, the hardware can dynamically detect the sampler accesses during workload execution, then configure itself to enable or disable samplers on the fly.

In a static mode, the SDL units may know prior to execution of a workload how may sample instructions are to be executed by the shader. For example, the SDLs can use information regarding the type of workload, the type of shader, and the particular set of instructions to estimate the sampler instruction density for a frame of a workload. In some examples, a compiler may be used to provide an estimate of sampler instruction density. Based on this estimate, the SDL units can determine a number of samplers to be enabled or disabled before the shader instructions have been dispatched. Additionally, in the static mode, a driver may be used to analyze key statistics of the workload and state the number of samplers to be enabled or disabled for the analyzed workload.

The SDL units may also operate in a hybrid mode. In the hybrid mode, hybrid sampler load balancing mode monitoring is done by the hardware, and the software is used to read counters to decide the number of samplers for each workload. For example, when each set of instructions is dispatched, the SDLs can access counter information and decide the number of samplers to be used.

In examples, the SDL can receive sample messages from its own sub-slice. The SDL may also receive sample message from other SDLs. The SDL can execute a sample message it receives on the sampler it is associated with. The SDL can also route the sample message it receives to other SDL for execution. The SDL can route the output generated by the sampler it is associated with to the execution units within the sub-slice it is associated with. Further, the SDL can route the output generated by the sampler it is associated with to any other SDL. The SDL can also receive sampler output from other SDL and route it to the execution units it is associated with. Additionally, the SDL can receive sampler output from other SDLs, and then re-route the output to another SDL.

Figure 4A:
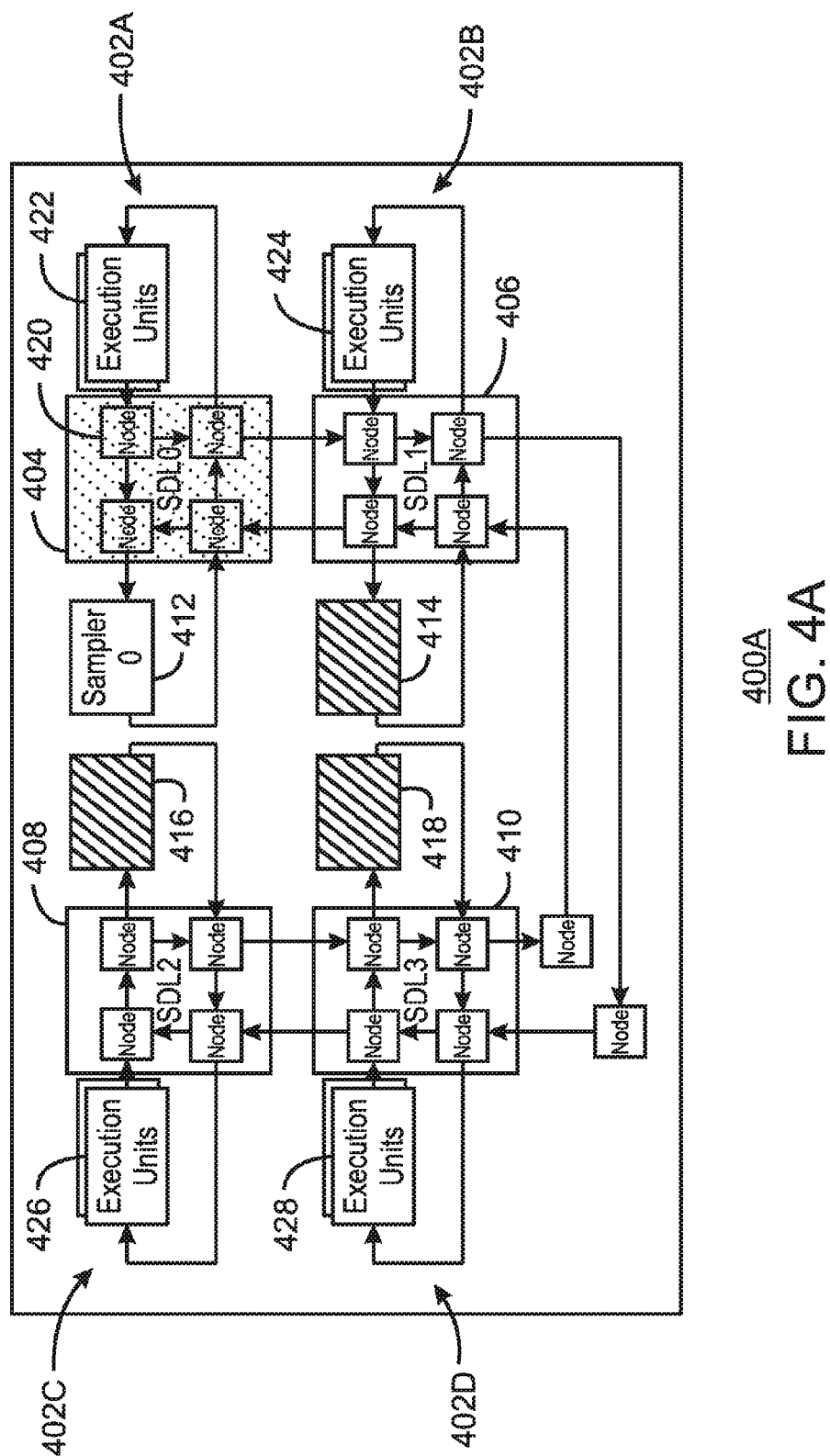
FIG. 4A is an illustration of a slice 400A.

FIG. 4A is an illustration of a slice 400A. The slice 400A includes a sub-slice 402A, a sub-slice 402B, a sub-slice 402C, and a sub-slice 402D. The sub-slice 402A includes a primary master SDL unit 404, as indicated by the dots within the SDL unit 404. The sub-slice 402B includes a slave SDL unit 406. The sub-slice 402C includes a slave SDL unit 408. The sub-slice 402D includes a slave SDL unit 410. Accordingly, the slice 400A includes a primary master SDL unit and three slave SDL units. The slice 400A also includes a sampler unit 412, a sampler unit 414, and sampler unit 416 and a sampler unit 418.

In FIG. 4A, the slice 400A shows the sampler unit 412 powered on, with the sampler unit 414, the sampler unit 416, and the sampler unit 418 each powered off. Each SDL unit includes one or more nodes 420 that are connected to the nodes of other SDL units. In some cases, a node is routing logic associated with an SDL. The node may also be routing logic between slices and sub-slices. The node will move the sampler message based on a header of the message. The sampler message may include the sampler instruction, the result of a sampler instruction, or any other data that is passed to and from a sampler unit. In some embodiments, a node includes two inbound ports and two outbound ports. On the inbound port, the node will receive messages. Similarly, on the outbound port, the node will dispatch the messages. Depending on the placement of the node within the SDL, the node may be connected to the sampler, execution unit, neighboring node with in the SDL, the neighboring node in the neighboring SDL, or any combination thereof. In examples, all SDLs in a slice connect to form a bi-directional ring topology, where rings in adjacent slices are connected at boundary SDLs. Boundary SDLs may be those SDLs that are located near a boundary of a slice or sub-slice. In such an example, ring topology is implemented based physical placement of the SDLs, however the SDLs are not restricted to a ring topology.

In embodiments, four nodes together can form a cross bar switch. The cross bar switch can accept requests from downstream SDLs, upstream SDLs, execution units, or sampler units and send the request to downstream SDLs, upstream SDLs, execution units, or sampler units. Downstream and upstream may be used to refer to the location of each SDL relative to other SDLs in a network. In this manner, the SDL units are used to interconnect the sampler units into a pool o network of sampler units, such that the sampler units can be powered off according to the workload being processed by the GPU. In FIG. 4A, the sampler units 414, 416, and 418 are powered off. However, the execution units connected to the sampler units 414, 416, and 418 may directed to execute sample instructions. In such a scenario, the sample instructions received by the execution units 424, 426, and 428 are routed to the sampler unit 412 for processing by the execution units 422, since their respective sampler units 414, 416 and 418 are powered off. The routing and re-routing of sample instructions enable the sampler units to operate as a network of sampler units, and to be powered on and off according to the workload being processed. For example, executing a shader may include sample instructions, such as a pixel shader. The pixel shader can sample multiple textures multiple times and blend them together to output a pixel color value. In some examples, rendering triangle may result in thousands and thousands of pixel shaders that are launched and executed. In such an example, the sampler units can be allocated in a network of sampler units statically, dynamically, or in a hybrid fashion to allocate the sampler units for the workload.

In examples, the routing between SDL units is enabled by a routing table. Each node may have a routing table that is updated either by software in the static or hybrid mode of operation when a sampler is powered up or powered down. The routing table may be updated by the primary master SDL and the master SDL in the dynamic mode of operation when a sampler is powered up or powered down. The routing table may include identification of the sampler units enabled in the system and a busyness indicator of the corresponding sampler. In some cases, the busyness indicator is a measure of the workload assigned to each sampler. The busyness indicator may also be an estimate of the amount of workload processing assigned to each sampler. Each sampler sends a broadcast message periodically to update its corresponding busyness indicator. When an execution unit makes a request to its associated SDL, the SDL selects the sampler unit to which the request should be routed based on the busyness indicator of each sampler unit in the network of samplers as per the routing table. The routing table may also include information on how to route the incoming message to the destination SDL based on the message header. To keep track of the re-routed instructions, a header of the instruction may be stamped with a source identifier by the SDL based on the current routing The re-routed instruction, may also be stamped with destination information.

In examples, the SDL units can be configured to work as a primary master SDL, a master SDL, or a slave SDL. A primary master SDL controls a cluster of associated sampler units and SDLs, include master SDLs and slave SDLs. A primary master SDL may allocate sample instructions to the sampler units based on the busyness indicators of the sampler units in the network, and may also make the decision to power down or power up the sampler units in the system. Selecting a slave SDL can be based on any arbitration scheme, such as a round robin scheme or the use of sampler load indicators. A master SDL can power on or power off any slave SDL that is assigned to the particular master SDL. The powering up or powering down can be based on the incoming sample messages. The particular SDL itself is not powered off, rather, the associated sampler is be powered on or off based on the incoming sample instructions of the workload.

A primary master SDL can promote a slave SDL to be a master SDL. In the event that a slave SDL is made master SDL, a subset of the slave SDLs are assigned to the new master SDL. The master SDL and the allotted slaves form their own sub-network, and the routing tables are updated appropriately in each node. The new master SDL then manages the subset of slave SDLs that were assigned to it. Additionally, once the slave SDLs are assigned to the new master SDL, they are not controlled by the Primary Master SDL. The master SDL can make the decision to power down or power up the sampler units in the system based on the busyness indicators of the sampler units allocated to it in the network. In some schemes, the primary master SDL cannot demote a master SDL to slave SDL without a demote request from the corresponding master SDL itself. Further, the new sub network formed by a newly assigned master slave SDL may have the same or a different topology when compared to the topology of the network including the primary master SDL.

A master SDL can power on or power off any slave SDL assigned to it. As noted above, the SDL itself is not powered off, it is the sampler associated with the SDL that is powered on or powered off. However, a slave SDL cannot power on or power off a sampler. Additionally, a master SDL cannot promote a slave SDL to master SDL. The master SDL can send a request to the primary master to demote it to slave SDL based on the sampler workload. In examples, the SDL units communicate with a power management unit to power up or power down a sampler. Additionally, in some embodiments, software may be used to initially designate each SDL as a primary master SDL, master SDL, or slave SDL. After the initial designation, in a hardware based dynamic mode a primary master SDL can further designate additional slave SDLs as new master SDLs based on the workload execution. Similarly, master SDLs can designate themselves as slave SDLs after the initial designation.

Figure 4B:
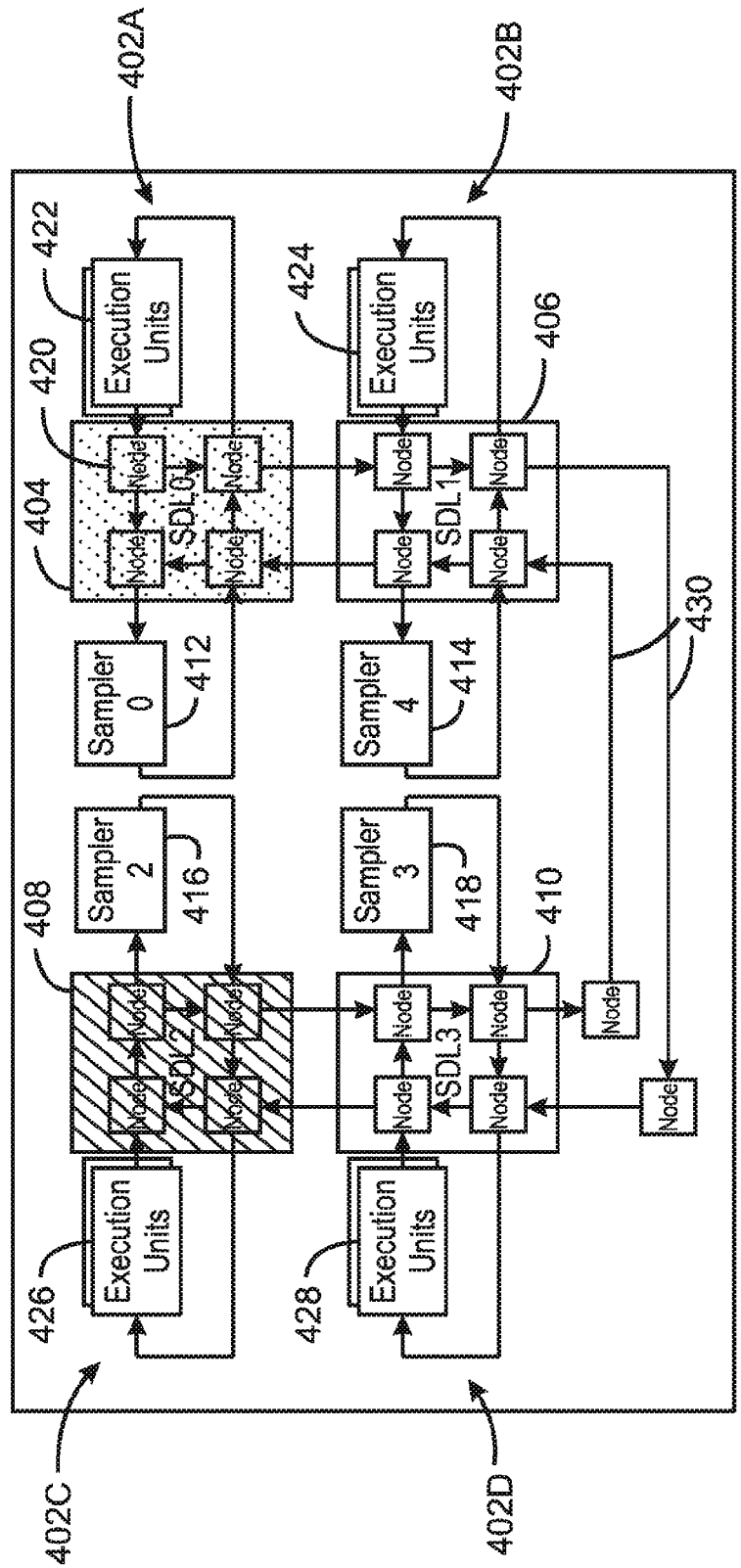
FIG. 4B is an illustration of a slice 400B.

FIG. 4B is an illustration of a slice 400B. The slice 400B includes sub-slices similar to that of slice 400A (FIG. 4A), including a sub-slice 402A, a sub-slice 402B, a sub-slice 402C, and a sub-slice 402D. However, the slice 400B also includes a primary master SDL unit 404 as indicated by the dots within the SDL unit 404, a master SDL unit 408, as indicated by the diagonal lines within the SDL unit 408, a slave SDL unit 406, and a slave SDL unit 410. The slice 400A also includes a sampler 412, a sampler 414, and sampler 416 and a sampler 418. Sampler instructions from execution units 422 and 424 get routed to SDL 404 and 406 based on the busyness indicators. Sampler instructions from execution units 426 and 428 get routed to SDL 408 and 410 based on the busyness indicators. In examples, the interconnect 430 between the slave SDL 406 and the slave SDL 410 is inactive, except for the messaging from the master SDL 408 to the primary master SDL 404. The interconnect 430 between the slave SDL 406 and the slave SDL 410 would not be used to route sample instructions. Although the network connection is described here as an interconnection 430, any type of connection may be used.

Figure 5:
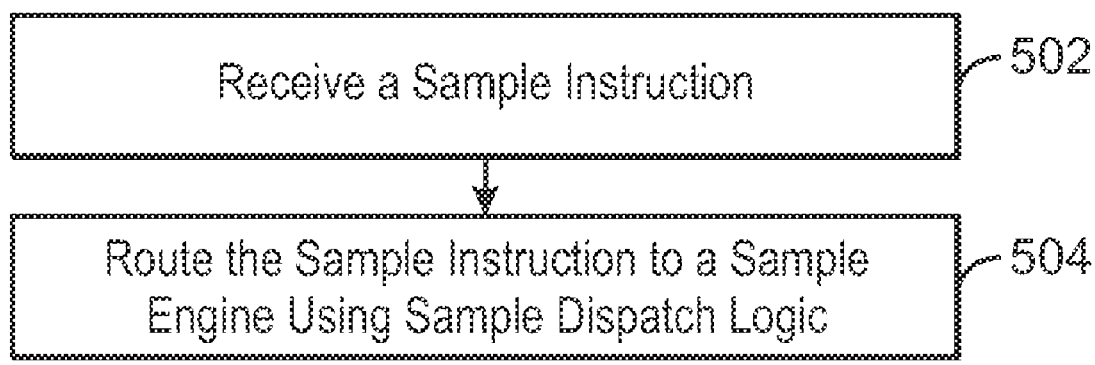
FIG. 5 is a method for sampler load balancing.

FIG. 5 is a method for sampler load balancing. At block 502, a sample instruction is received. In embodiments, the sample instruction is received by an execution unit. At block 504, the sample instruction is routed to a sampler using sample dispatch logic. In embodiments, the sample dispatch logic forms a network between a plurality of samplers. The sample instruction may be routed to a sampler that is powered on and the least loaded based on the busyness indicator of each sampler unit, where the power status of the sampler unit is based on the workload being executed by the GPU.

Figure 6:
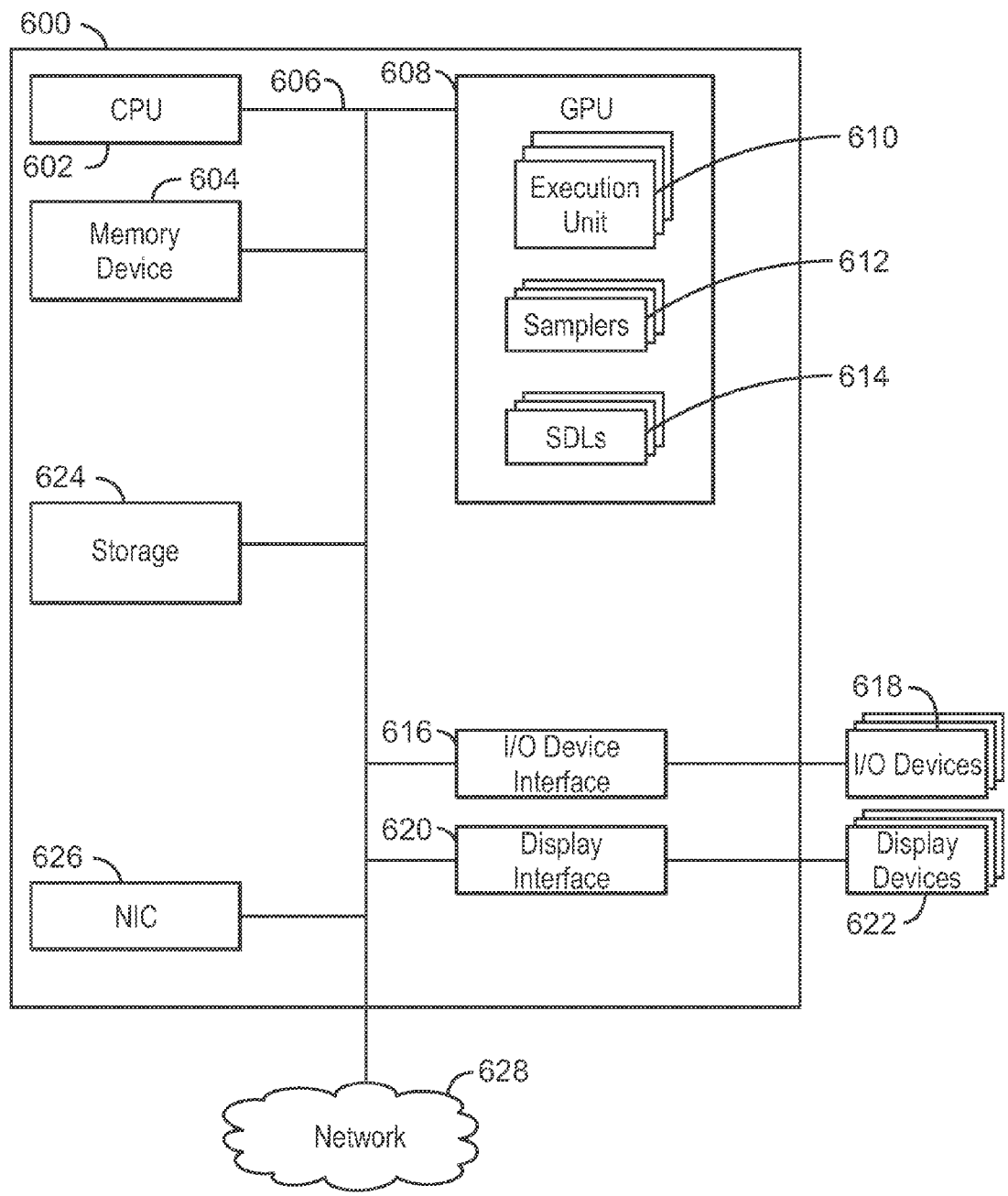
FIG. 6 is a block diagram of a computing device 600 that may be used for sampler load balancing.

FIG. 6 is a block diagram of a computing device 600 that may be used for sampler load balancing, in accordance with an embodiment. The computing device 600 may be, for example, a laptop computer, desktop computer, ultrabook, tablet computer, mobile device, or server, among others. The computing device 600 may include a central processing unit (CPU) 602 that is configured to execute stored instructions, as well as a memory device 604 that stores instructions that are executable by the CPU 602. The CPU may be coupled to the memory device 604 by a bus 606. Additionally, the CPU 602 can be a single core processor, a multi-core processor, a computing cluster, or any number of other configurations. Furthermore, the computing device 600 may include more than one CPU 602.

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600. The GPU 608 includes a plurality of execution units 610. The executions units 610 may process threads from any number of graphics operations. The GPU 608 also includes a plurality of samplers 612 and a plurality of sampler dispatch logic units 624. The samplers 612 may operate as a pooled network of samplers using the sampler dispatch logic units 624 as discussed above. The memory device 604 can include random access memory (RAM), read only memory (ROM), flash memory, or any other suitable memory systems. For example, the memory device 604 may include dynamic random access memory (DRAM).

The CPU 602 may also be connected through the bus 606 to an input/output (I/O) device interface 616 configured to connect the computing device 600 to one or more I/O devices 618. The I/O devices 618 may include, for example, a keyboard and a pointing device, wherein the pointing device may include a touchpad or a touchscreen, among others. The I/O devices 618 may be built-in components of the computing device 600, or may be devices that are externally connected to the computing device 600.

The CPU 602 may be linked through the bus 606 to a display interface 620 configured to connect the computing device 600 to a display device 622. The display device 622 may include a display screen that is a built-in component of the computing device 600. The display device 622 may also include a computer monitor, television, or projector, among others, that is externally connected to the computing device 600.

The computing device also includes a storage device 624. The storage device 624 is a physical memory such as a hard drive, an optical drive, a thumbdrive, an array of drives, or any combinations thereof. The storage device 624 may also include remote storage drives. The computing device 600 may also include a network interface controller (NIC) 626 may be configured to connect the computing device 600 through the bus 606 to a network 628. The network 628 may be a wide area network (WAN), local area network (LAN), or the Internet, among others.

The block diagram of FIG. 6 is not intended to indicate that the computing device 600 is to include all of the components shown in FIG. 6. Further, the computing device 600 may include any number of additional components not shown in FIG. 6, depending on the details of the specific implementation.

Figure 7:
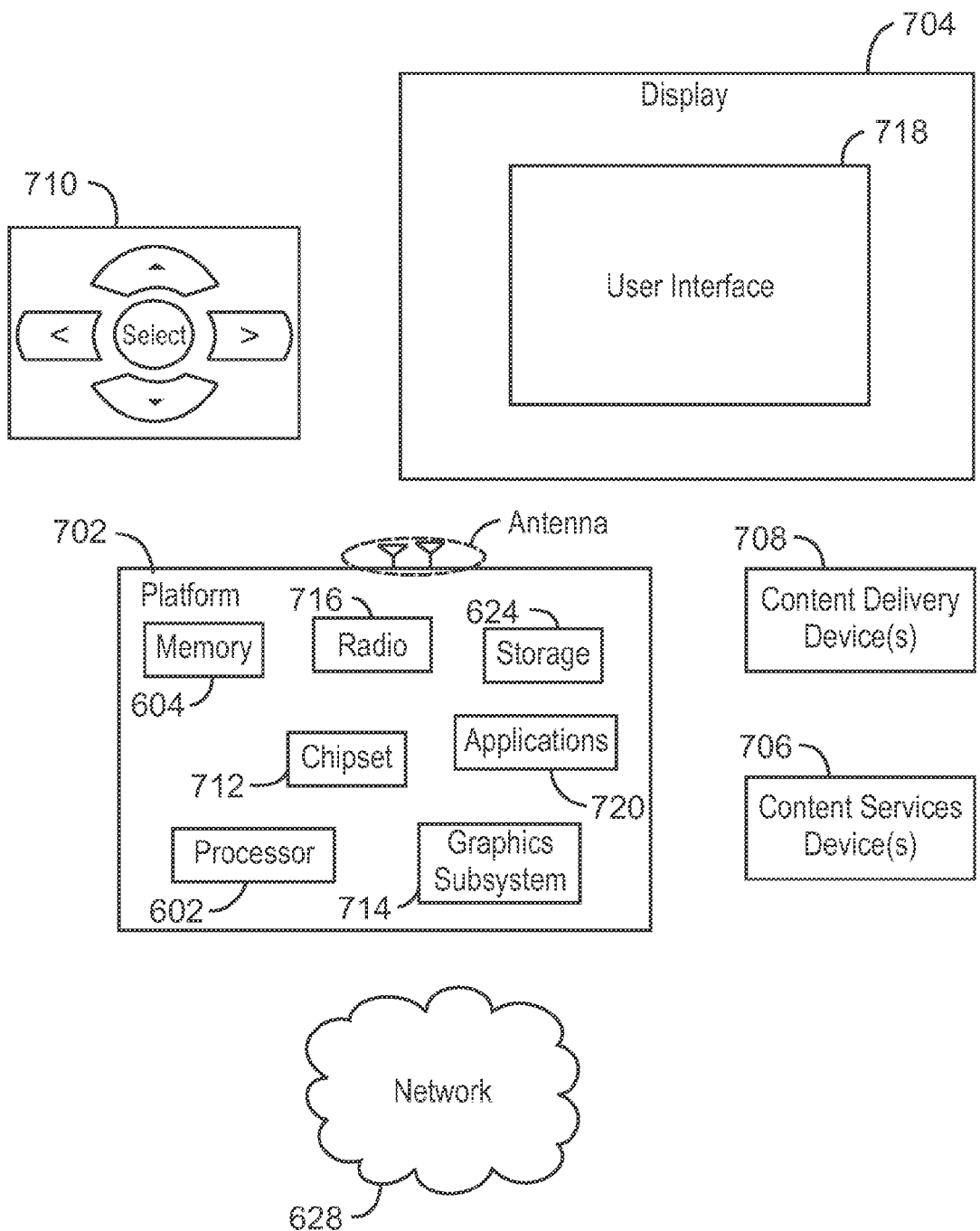
FIG. 7 is a block diagram of an exemplary system 700 that performs sampler load balancing.

FIG. 7 is a block diagram of an exemplary system 700 that performs sampler load balancing. Like numbered items are as described with respect to FIG. 6. In some embodiments, the system 700 is a media system. In addition, the system 700 may be incorporated into a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, a printing device, an embedded device or the like.

In various embodiments, the system 700 comprises a platform 702 coupled to a display 704. The platform 702 may receive content from a content device, such as content services device(s) 706 or content delivery device(s) 708, or other similar content sources. A navigation controller 710 including one or more navigation features may be used to interact with, for example, the platform 702 and/or the display 704. Each of these components is described in more detail below.

The platform 702 may include any combination of a chipset 712, a central processing unit (CPU) 602, a memory device 604, a storage device 624, a graphics subsystem 714, applications 720, and a radio 716. The chipset 712 may provide intercommunication among the CPU 602, the memory device 604, the storage device 624, the graphics subsystem 714, the applications 720, and the radio 716. For example, the chipset 712 may include a storage adapter (not shown) capable of providing intercommunication with the storage device 624.

The CPU 602 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 602 includes multi-core processor(s), multi-core mobile processor(s), or the like. The memory device 604 may be implemented as a volatile memory device such as, but not limited to, a Random Access Memory (RAM), Dynamic Random Access Memory (DRAM), or Static RAM (SRAM). The storage device 624 may be implemented as a non-volatile storage device such as, but not limited to, a magnetic disk drive, optical disk drive, tape drive, solid state drive, an internal storage device, an attached storage device, flash memory, battery backed-up SDRAM (synchronous DRAM), and/or a network accessible storage device. In some embodiments, the storage device 624 includes technology to increase the storage performance enhanced protection for valuable digital media when multiple hard drives are included, for example.

The graphics subsystem 714 may perform processing of images such as still or video for display. The graphics subsystem 714 may include a graphics processing unit (GPU), such as the GPU 608, or a visual processing unit (VPU), for example. An analog or digital interface may be used to communicatively couple the graphics subsystem 714 and the display 704. For example, the interface may be any of a High-Definition Multimedia Interface, DisplayPort, wireless HDMI, and/or wireless HD compliant techniques. The graphics subsystem 714 may be integrated into the CPU 602 or the chipset 712. Alternatively, the graphics subsystem 714 may be a stand-alone card communicatively coupled to the chipset 712.

The graphics and/or video processing techniques described herein may be implemented in various hardware architectures. For example, graphics and/or video functionality may be integrated within the chipset 712. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 716 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 716 may operate in accordance with one or more applicable standards in any version.

The display 704 may include any television type monitor or display. For example, the display 704 may include a computer display screen, touch screen display, video monitor, television, or the like. The display 704 may be digital and/or analog. In some embodiments, the display 704 is a holographic display. Also, the display 704 may be a transparent surface that may receive a visual projection. Such projections may convey various forms of information, images, objects, or the like. For example, such projections may be a visual overlay for a mobile augmented reality (MAR) application. Under the control of one or more applications 720, the platform 702 may display a user interface 718 on the display 704.

The content services device(s) 706 may be hosted by any national, international, or independent service and, thus, may be accessible to the platform 702 via the Internet, for example. The content services device(s) 706 may be coupled to the platform 702 and/or to the display 704. The platform 702 and/or the content services device(s) 706 may be coupled to a network 628 to communicate (e.g., send and/or receive) media information to and from the network 628. The content delivery device(s) 708 also may be coupled to the platform 702 and/or to the display 704.

The content services device(s) 706 may include a cable television box, personal computer, network, telephone, or Internet-enabled device capable of delivering digital information. In addition, the content services device(s) 706 may include any other similar devices capable of unidirectionally or bidirectionally communicating content between content providers and the platform 702 or the display 704, via the network 628 or directly. It will be appreciated that the content may be communicated unidirectionally and/or bidirectionally to and from any one of the components in the system 700 and a content provider via the network 628. Examples of content may include any media information including, for example, video, music, medical and gaming information, and so forth.

The content services device(s) 706 may receive content such as cable television programming including media information, digital information, or other content. Examples of content providers may include any cable or satellite television or radio or Internet content providers, among others.

In some embodiments, the platform 702 receives control signals from the navigation controller 710, which includes one or more navigation features. The navigation features of the navigation controller 710 may be used to interact with the user interface 718, for example. The navigation controller 710 may be a pointing device or a touchscreen device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 710 may be echoed on the display 704 by movements of a pointer, cursor, focus ring, or other visual indicators displayed on the display 704. For example, under the control of the applications 720, the navigation features located on the navigation controller 710 may be mapped to virtual navigation features displayed on the user interface 718. In some embodiments, the navigation controller 710 may not be a separate component but, rather, may be integrated into the platform 702 and/or the display 704.

The system 700 may include drivers (not shown) that include technology to enable users to instantly turn on and off the platform 702 with the touch of a button after initial boot-up, when enabled, for example. Program logic may allow the platform 702 to stream content to media adaptors or other content services device(s) 706 or content delivery device(s) 708 when the platform is turned "off." In addition, the chipset 712 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 700 may be integrated. For example, the platform 702 and the content services device(s) 706 may be integrated; the platform 702 and the content delivery device(s) 708 may be integrated; or the platform 702, the content services device(s) 706, and the content delivery device(s) 708 may be integrated. In some embodiments, the platform 702 and the display 704 are an integrated unit. The display 704 and the content service device(s) 706 may be integrated, or the display 704 and the content delivery device(s) 708 may be integrated, for example.

The system 700 may be implemented as a wireless system or a wired system. When implemented as a wireless system, the system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 7.

Figure 8:
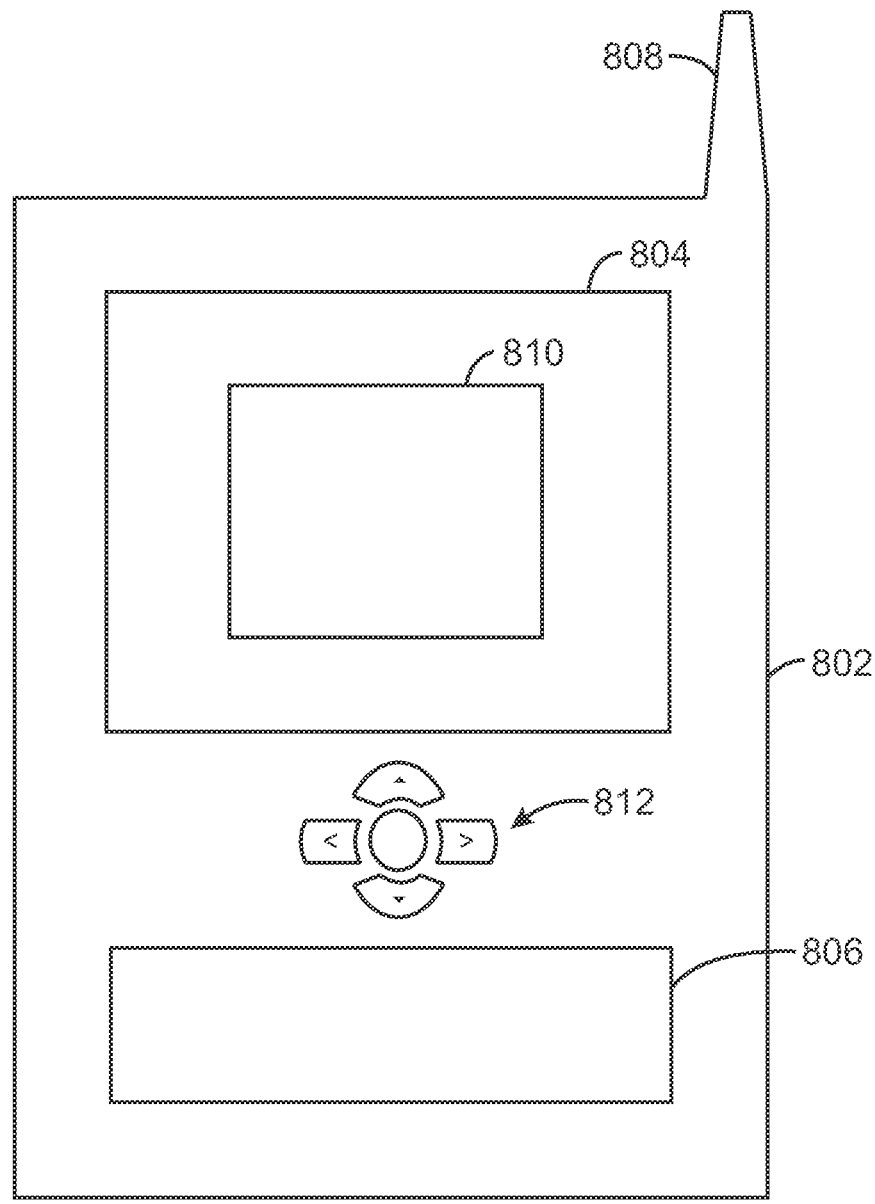
FIG. 8 is a schematic of a small form factor device 600 in which the system 700 of FIG. 7 may be embodied.

FIG. 8 is a schematic of a small form factor device 800 in which the system 700 of FIG. 7 may be embodied, in accordance with an embodiment. Like numbered items are as described with respect to FIG. 7. In some embodiments, for example, the device 800 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wired or wireless mobile computing devices as well.

As shown in FIG. 8, the device 800 may include a housing 802, a display 804, an input/output (I/O) device 806, and an antenna 808. The device 800 may also include navigation features 812. The display 804 may include any suitable display 810 unit for displaying information appropriate for a mobile computing device. The I/O device 806 may include any suitable I/O device for entering information into a mobile computing device. For example, the I/O device 806 may include an alphanumeric keyboard, a numeric keypad, a touch pad, input keys, buttons, switches, rocker switches, microphones, speakers, a voice recognition device and software, or the like. Information may also be entered into the device 800 by way of microphone. Such information may be digitized by a voice recognition device.

EXAMPLE 1

A graphics processing unit is described herein. The graphics processing unit includes a plurality of execution units and a plurality of sampler units. Each sampler unit corresponds to a sampler dispatch logic unit and at least one execution unit, wherein the sampler dispatch logic units are used to network the plurality of sampler units. The network of sampler units may be formed by an interconnect. A topology of connecting the sampler units in the network of the plurality of sampler units may be based on a physical placement of the sampler units. Additionally, an SDL floor plan can be used to connect sampler units, where the neighboring SDLs are connected based on the floor plan and ease of connection. A software interface may be used to control the number of samplers to be enabled or disabled. The sampler dispatch logic units may be dynamic load balancer units that are located at the input of every sampler. Also, the sampler dispatch logic unit and the sampler unit may be assigned a unique identification. The sampler dispatch logic units can implement statistic counters to account for the accesses to the samplers, and wherein statistics are read by software and used to balance with workload allocated to each sample.

EXAMPLE 2

A method for sampler load balancing is described herein. The method includes receiving a sample instruction at an execution unit and routing the sample instruction from the execution unit to a sampler unit. The routing may be based on a sampler dispatch logic, wherein the sampler dispatch logic forms a network that includes a plurality of sampler units. The plurality of sampler units may be allocated using a software based dynamic mode. Also, the plurality of sampler units may be allocated using a hardware based dynamic mode. Further, the plurality of sampler units may be allocated using a static mode. The plurality of sampler units may also be allocated using a hybrid mode. The sampler unit that receives the sample instruction may execute the sample instruction and returns the results of the executed sample instruction to the execution unit using the sampler dispatch logic. The sampler dispatch logic may include sampler dispatch logic units. Each of the sampler dispatch logic units may be designated as a primary master sampler dispatch logic unit, a master sampler dispatch logic unit, a slave sampler dispatch logic unit, or any combination thereof. The primary master SDL may enable and disable any sampler unit in the network based on a busyness indicator. The primary master can also make any slave SDL a master SDL and assign selected slave SDLs to be managed by the master SDL. The master SDL can enable and disable a sampler unit assigned to it based on the sampler access to its assigned samplers. Additionally, the master SDL can release its control over the assigned sampler units to the primary master SDL. Further, the sampler dispatch logic may communicate with a power management unit to power up or power down a sampler when the associated sampler is enabled or disabled by primary master or master SDL.

EXAMPLE 3

A system is described herein. The system includes a sampler dispatch logic that includes a display, a radio, a memory that is to store instructions and that is communicatively coupled to the display, and a processor communicatively coupled to the radio and the memory. When the processor is to execute the instructions, the processor is to receive a sample instruction at an execution unit. The processor is to also route the sample instruction from the execution unit to a sampler unit based on a sampler dispatch logic, wherein the sampler dispatch logic forms a network that includes a plurality of sampler units. The sampler unit that receives the sample instruction may execute the sample instruction and return the results of the executed sample instruction to the execution unit using the sampler dispatch logic. The sampler dispatch logic may include sampler dispatch logic units, and wherein the sampler dispatch logic units are designated as a primary master sampler dispatch logic unit, a master sampler dispatch logic unit, or a slave sampler dispatch logic unit.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A graphics processing unit, comprising:
   a plurality of execution units; and
   a plurality of sampler units, each sampler unit coupled to each of the plurality of execution units through one or more sampler dispatch logic (SDL) units, wherein the one or more SDL units are used to network the plurality of sampler units as a resource pool to each of the plurality of execution units, and wherein at least one of the one or more SDL units is to calculate an estimate of a number of sample instructions to be executed for a workload and determine a number of sampler units to be enabled based on the estimate.

2. The graphics processing unit of claim 1, wherein the network of sampler units is formed by an interconnect.

3. The graphics processing unit of claim 1, wherein a topology of connecting the sampler units in the network of the plurality of sampler units is based on a physical placement of the sampler units.

4. The graphics processing unit of claim 1, wherein a sampler dispatch logic (SDL) floor plan is used to connect sampler units, where the neighboring SDLs are connected based on the floor plan and ease of connection.

5. The graphics processing unit of claim 1, comprising a software interface that may be used to control the number of sampler units to be enabled or disabled.

6. The graphics processing unit of claim 1, wherein the SDL units are dynamic load balancer units that are located at the input of every sampler.

7. The graphics processing unit of claim 1, wherein the SDL unit and the sampler unit are assigned a unique identification.

8. The graphics processing unit of claim 1, wherein the SDL units implement statistic counters to account for the accesses to the sampler units, and wherein statistics are read by software and used to balance the workload allocated to each sampler unit.

9. A method for sampler load balancing, comprising:
   estimating a number of sample instructions to be executed for a workload;
   determining a number of sampler units to be enabled based on the estimate;
   receiving a sample instruction at one of a plurality of execution units; and
   routing the sample instruction from the execution unit to a sampler unit based on a sampler dispatch logic (SDL), wherein the SDL forms a network that includes a plurality of sampler units each coupled to each of the plurality of executions units through the SDL, and wherein the plurality of sampler units form a resource pool available to each of the plurality of execution units.

10. The method of claim 9, wherein the plurality of sampler units is allocated using a software based dynamic mode.

11. The method of claim 9, wherein the plurality of sampler units is allocated using a hardware based dynamic mode.

12. The method of claim 9, wherein the plurality of sampler units is allocated using a static mode.

13. The method of claim 9, wherein the plurality of sampler units is allocated using a hybrid mode.

14. The method of claim 9, wherein the sampler unit that receives the sample instruction executes the sample instruction and returns the results of the executed sample instruction to the execution unit using the SDL.

15. The method of claim 9, wherein the SDL includes SDL units.

16. The method of claim 15, wherein each of the SDL units is designated as a primary master sampler dispatch logic (SDL) unit, a master sampler dispatch logic (SDL) unit, a slave sampler dispatch logic (SDL) unit, or any combination thereof.

17. The method of claim 16, wherein the primary master SDL enables and disables any sampler unit in the network based on a busyness indicator.

18. The method of claim 16, wherein the primary master SDL makes any slave SDL a master SDL and assigns selected slave SDLs to be managed by the master SDL.

19. The method of claim 16, wherein the master SDL enables and disables a sampler unit assigned to it based on the sampler unit access to its assigned sampler units.

20. The method of claim 16, wherein the master SDL releases its control over the assigned sampler units to the primary master SDL.

21. The method of claim 9, wherein the SDL communicates with a power management unit to power up or power down a sampler when the associated sampler is enabled or disabled by primary master SDL or master SDL.

22. A system that includes a sampler dispatch logic comprising:
   a display;
   a memory that is to store instructions and that is communicatively coupled to the display; and
   a processor communicatively coupled to the memory, wherein when the processor is to execute the instructions, the processor is to:
      estimate a number of sample instructions to be executed for a workload;
      determine a number of sampler units to be enabled based on the estimate;
      receive a sample instruction at one of a plurality of execution units; and
      route the sample instruction from the one of the plurality of execution units to a sampler unit based on a sampler dispatch logic, wherein the sampler dispatch logic forms a network that includes a plurality of sampler units each coupled to each of the plurality of execution units through the sampler dispatch logic, wherein the sampler dispatch logic is used to network the plurality of sampler units as a resource pool to each of the plurality of execution units.

23. The system of claim 22, wherein the sampler unit that receives the sample instruction executes the sample instruction and returns the results of the executed sample instruction to the execution unit using the sampler dispatch logic.

24. The system of claim 22, wherein the sampler dispatch logic includes sampler dispatch logic units, and wherein the sampler dispatch logic units are designated as a primary master sampler dispatch logic unit, a master sampler dispatch logic unit, or a slave sampler dispatch logic unit.

* * * * *